United States Patent
Voigt et al.

(10) Patent No.: US 8,706,531 B1
(45) Date of Patent: Apr. 22, 2014

(54) AUTOMATIC INSURANCE QUOTE SYSTEM AND METHOD

(75) Inventors: Michael Wayne Voigt, San Antonio, TX (US); Gregory Brian Meyer, San Antonio, TX (US); Alfredo Antonio Bachicha, San Antonio, TX (US); Shana Rae Fraga, San Antonio, TX (US); Robert John Dizinno, San Antonio, TX (US); Rebecca Trujillo Castillo, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 758 days.

(21) Appl. No.: 11/849,943

(22) Filed: Sep. 4, 2007

(51) Int. Cl.
*G06Q 40/00* (2012.01)
(52) U.S. Cl.
USPC ............. 705/4; 705/35; 705/37; 705/36 R; 705/1.1
(58) Field of Classification Search
USPC ............ 705/1, 4, 1.1, 35, 37, 36 R; 235/385; 463/25; 700/235, 244
See application file for complete search history.

(56) References Cited

U.S. PATENT DOCUMENTS

| | | | |
|---|---|---|---|
| 7,277,861 B1* | 10/2007 | Benson et al. | 705/4 |
| 2002/0116228 A1* | 8/2002 | Bauer et al. | 705/4 |
| 2002/0143583 A1* | 10/2002 | Reader et al. | 705/4 |
| 2003/0069761 A1* | 4/2003 | Nozaki et al. | 705/4 |
| 2008/0082370 A1* | 4/2008 | Collins et al. | 705/4 |

OTHER PUBLICATIONS

Farmers. "What is a Farmers Friendly Review?" Farmers Group, Inc. Aug. 1999.
Cigna. "There's more to life: what you should know about life insurance." Cigna, Aug. 2007.
Field, D. "Brits getting careless with life insurance." uknetguide. [retrieved from the Internet on Jan. 18, 2008 using <URL: http://www.uknetguide.co.uk/Finance/Article/Brits_getting_careless_with_life_insurance.html>].
Praeger, S. "Life Insurance and Annuity Basics." Kansas Insurance Department, Sandy Praeger—Commissioner of Insurance, Reprinted Spring 2005, p. 1-19.

* cited by examiner

*Primary Examiner* — John H Holly
(74) *Attorney, Agent, or Firm* — Brooks, Cameron & Huebsch, PLLC

(57) ABSTRACT

The present disclosure includes a method and system for detecting a change in circumstances of a customer and for proactively providing a response thereto, such as insurance quotes and/or coverage changes, to the customer and/or to one or more dependents of the customer. The customer may also initiate and accept an insurance quote for the dependent, and the dependent may initiate and accept an insurance quote on his/her own behalf. The insurance company may utilize data known to the company, or provided by an existing dependent of the customer, to communicate the response to the customer. The response may be communicated independently of a direct request from the dependents. Other dependents of the customer may also receive communications and provide authorization to change an existing policy. The response may also be communicated to a batch of customers meeting certain common criteria, independent of a direct customer request.

18 Claims, 9 Drawing Sheets

| | | |
|---|---|---|
| 802 | Effective date: | June 14, 2007 |
| 804 | Get quote for: | ○ Self<br>○ Spouse<br>◉ Child |
| 806 | Name:<br>Address: | John Doe<br>123 Main<br>Anytown, TX 77777 |

| | | |
|---|---|---|
| 808 | Question 1? | ○ Yes  ◉ No |
| 810 | Question 2? | ▼ |
| 812 | Question 3? | ▼ |
| 814 | Question 4? | |

800

[Cancel] 816   [Get Quote] 818   [Send Quote] 820   [Apply] 822

FIG. 8

AUTOMATIC INSURANCE QUOTE SYSTEM AND METHOD

CROSS-REFERENCE TO RELATED APPLICATIONS

This application is related in subject matter to, and incorporates herein by reference in its entirety, each of the following: U.S. patent application entitled "Automatic Insurance Quote System and Method," and assigned Ser. No. 11/849,945, filed on the same date as this application; and U.S. patent application entitled "Automatic Insurance Quote System and Method," and assigned Ser. No. 11/849,947, filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field

The disclosure relates to computerized systems, and, more specifically, to systems and methods related to changes in insurance.

2. Description of Related Art

Customers routinely have insurance changes, particularly for automobiles. These insurance changes are largely driven by changes in circumstances. A new automobile, a change in address, an accident, a divorce, a child who reaches certain age criteria, becomes married, goes to college, moves out of the home, and other change in circumstances typically cause a change in insurance. In many circumstances, the change results in an increase or decrease in premiums, deductibles, coverage, or issuance of other insurance policies.

Regardless of the change in circumstances, the customer, being aware of the change, is typically expected to report these changes to the insurance company in order for the insurance company to adjust the insurance coverage for the change in circumstances. The insurance company typically does not have independent knowledge of the changes without the customer's input, and does not utilize independent knowledge to initiate adjustments in insurance. If the customer forgets to notify the insurance company, he/she may not receive the benefit of any adjustments in insurance coverage for some time, and the insurance company may lose the benefit of any additional revenues, or even additional customers, as children grow into adults with new vehicles, residences, or other changes. In some cases, the customer may not know that a change in circumstances will cause a change in insurance, and thus may not know to report the change.

Even if the customer is aware that a change in circumstance will result in a change in insurance, there is often little that he/she can do about it insofar as dependents are concerned. For example, if a child is about to be removed from customer's insurance policy, the customer, although well aware of the pending change, is currently not able on his/her own to quote and issue a new insurance policy for the child. Nor is the child currently able to quote and issue a new insurance policy of his/her own unless he/she has an existing insurance policy with the insurance company. Thus, the customer must typically enlist the aid of an insurance company representative to perform these tasks.

Thus, there remains a need to provide a method and system for insurance companies to automatically detect changes in circumstances of customers and proactively provide insurance quotes and/or insurance coverage to the customers, and/or to allow such customers and/or their dependents to proactively request and issue such insurance coverage for the dependents.

SUMMARY

The present disclosure includes a method and system for detecting a change in circumstances of a customer and for proactively providing a response thereto, such as insurance quotes and/or coverage changes, to the customer and/or to one or more dependents of the customer. The customer may also initiate an insurance quote for the dependent and may accept the quote on the dependent's behalf. The dependent may initiate and accept an insurance quote on his/her own behalf. The insurance company may utilize data known to the company, or provided by an existing dependent of the customer, to communicate the response to the customer. The response may be communicated to one or more dependents of the customer independently of a direct request from the one or more dependents. The response may be accepted by the dependent to create a change in insurance coverage for the dependent. Other dependents of the customer may also receive communications and provide authorization to change an existing policy. The response may also be communicated to a batch of customers meeting certain common criteria, independent of a direct customer request, regarding such a change in circumstances.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. §112.

FIG. 9 illustrates an exemplary system that may be used to implement the disclosed embodiments.

DETAILED DESCRIPTION

One or more illustrative embodiments of the concepts disclosed herein are presented below. For the sake of clarity, not all features of an actual implementation are described or shown in this application. It is understood that in the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
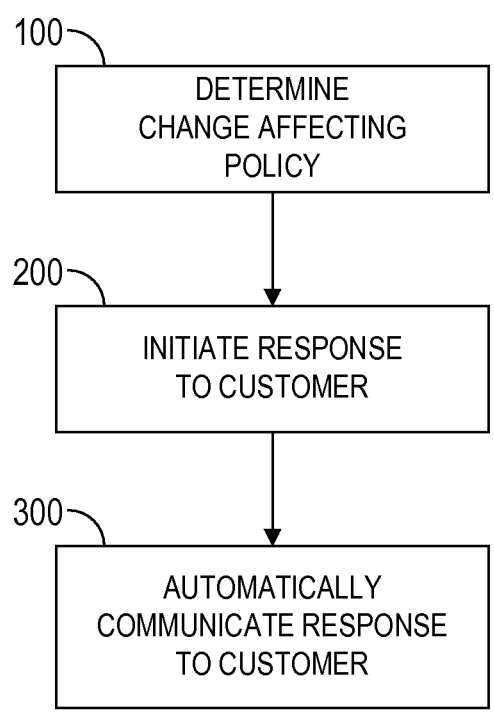
FIG. 1 is a schematic flowchart of an overall embodiment for responding to changes in circumstances regarding an insurance policy.

FIG. 1 is a schematic flowchart of one embodiment for responding to changes of circumstances regarding an insurance policy. In general, the embodiment provides a system and method that communicate automatic responses to changes of circumstances to a customer. As mentioned earlier, the term "response" may include a new quote, a change or adjustment in coverage amount, premium, deductible, or even an entirely new policy. The flowchart begins at Block 100, where the system and method may determine one or more changes of circumstances of a customer that affects the customer's insurance policy. For example and without limitation, such changes of circumstances may include a dependent, such as a child or a spouse, meeting certain criteria, such as reaching an age of majority (e.g., age 18) as determined by many states in the United States, a customer moving to a new address, a customer acquiring or selling a new vehicle, and other typical changes of circumstances that are normally reported by the customer.

In Block 200, the system and method may initiate an automatic response to the customer based upon the change of circumstances. The system may gather information, as may be available, in an electronic format, and automatically initiate an appropriate response for the change of circumstances. The initiation of the response may include calculating a new premium for insurance policy, based on the change of circumstances. In some cases, the system and method may calculate a quote for a new insurance policy, if the change of circumstances shows that a new policy is appropriate in addition to, or in lieu of, the existing insurance policy.

In Block 300, the system may automatically communicate a response to the customer. For example and without limitation, the automatic response may be a quote reflective of the change. If the change is a new automobile, an automatic quote may be sent to the customer to insure the automobile. If a dependent has reached the age of majority, an automatic quote for a new insurance policy for the dependent may be sent to the dependent, and/or one or more dependents of the customer who are not the dependent. Further, a response may be sent to the one or more dependents who are not the dependent to notify of a corresponding change in the existing insurance policy. For purposes of this disclosure, a "dependent" includes a person living in a household with at least one parent, a spouse, another relative, or other persons relying on the customer or a dependent of the customer for aid and support. Such dependency may occur prior to the change in circumstances, for example, if the change results in deleting at least a portion of insurance coverage to an existing policy, or after the change in circumstances, if the change results in adding at least a portion of insurance coverage to the existing insurance policy.

The customer may decide whether the proposed changes in the insurance policy or policies are appropriate and confirm such changes. In other embodiments, the changes may be made by default, and the customer is allowed to decline the changes. In general, the "customer" may be an individual, business, educational institution, government entity, or any other natural or created entity. The customer may include one or more dependents. For example, a typical family may include a husband, wife, and children, or a single parent with children. Depending upon the type of change of circumstances, one or more dependents of the customer may remain covered under the existing insurance policy, while one or more other dependents may not be covered for that change in circumstances, if the change occurs. Thus, in some embodiments, the responses may be sent to one or both groups of such dependents. The dependent, who is covered by the existing insurance policy after the change in circumstances occurs, will generally have an interest in receiving a response regarding the change in circumstances, such as a decrease or increase in insurance premiums, or other changes regarding coverage. The one or more dependents, who will not be covered for the particular change in circumstances after the change in circumstances occurs, may also have an interest in receiving a response, such as a quote for a separate insurance policy. By stating the one or more dependents will not be covered, such phrase and the like are intended to refer to a lack of insurance coverage regarding the particular change in circumstances after the change occurs, realizing that the one or more dependents could be covered for other matters. For example, a new automobile may be not covered, unless it becomes insured, while the remaining automobiles could remain covered. Categories of dependents potentially not covered could include those who reach a certain age, move away from the primary residence of the remaining dependents and establishes his/her own residence, become married, or other circumstances that would dictate a natural change in the existing insurance policy.

The current disclosure provides for automatic changes, quotes, and other responses that may be appropriate for the change in circumstances, without necessarily receiving the direct input of one or more dependents of the customer. A dependent may reach a certain age and an automatic response is sent to the dependent based on the information in a database of the system, without necessitating a direct inquiry from the dependent. A "database" includes any electronic data storage media for purposes of this disclosure herein. A corresponding response may be sent to the parent or parents notifying them of the outgoing response to the dependent. Further, the response to the parent or parents may include a corresponding change in the existing insurance policy, and a quote showing the effect of the change. On the other hand, a dependent may directly inquire from the insurance about a quote for their own insurance policy through other circumstances, and the inquiry from the dependent may initiate an automatic response to the parent or parents showing the effect of the change of circumstances, if such circumstances occur. If the dependent were to have his/her own insurance policy, then the parent insurance policy would presumably be lowered. The parents may accept, object, or adjust the coverage and the quote for the change. Further, the parents may initiate a contact with the insurance company to notify them of a change of address of the dependent, or certain age of the dependent, and the insurance company may respond to the parent while also sending an automated response to the dependent offering a new policy or other responses appropriate to the change as a result of the parent's input, and not the dependent's input.

Figure 2:
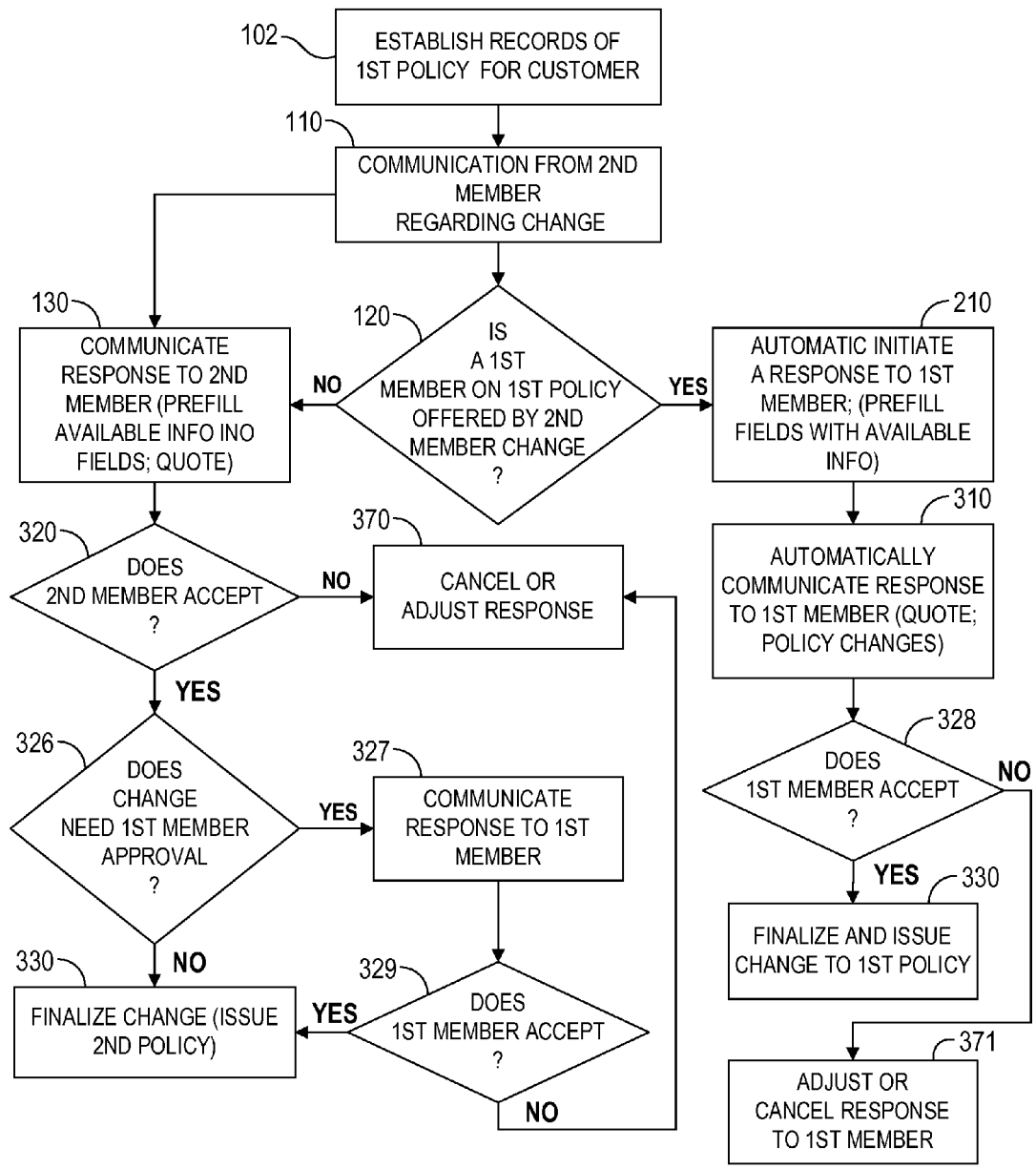
FIG. 2 is an exemplary schematic flowchart, illustrating an automatic response sent to one or more dependents of the customer.

FIG. 2 is an exemplary schematic flowchart, illustrating an automatic response sent to one or more members of a family. The family in this example has at least a first insurance policy, and at least a first family member (primary insured) and a second family member (dependent) associated with the policy. In Block 102, an insurance company may establish records for a first policy for a family. Typical database information includes house address, type of building, square footage, rooms, and other factors that would be appropriate for a home insurance policy, while automobile make, year, model, yearly mileage, purchase price, and other information would be appropriate for an automobile insurance policy. Other insurance policies, such as medical, life, and other types of insurance policies may have corresponding information and application to the concepts disclosed herein.

In Block 110 the second family member may communicate to the insurance company, regarding a change possibly affecting the first policy. For example, the second family member may inform the insurance company that the second family member is relocating to an independent residence, has reached a certain age in which the insurance coverage may need adjustment or cancellation as to that second family member, the second family member may be attending college in a remote location, and other changes.

In Block 120, the system may decide whether a first family member on the first policy is affected by the second family member change. If the answer is negative, the system may respond to the second family member communication without a response to the first family member regarding the first policy in Block 130. If the answer is affirmative, as will be generally expected, in Block 210, the system may automatically initiate a response to the first family member. This response may include, for example and without limitation, pre-filling fields with available information from the database available to the insurance company. In Block 310, the insurance company may automatically communicate a response to the first family member, such as the listing of the policy changes and/or a corresponding quote. In Block 328, the system may determine whether the first family member accepts the change. If the answer is affirmative, the system may finalize and issue a change to the first policy in Block 330. If the answer is negative, the system may adjust or cancel the response to the first family member and leave the first policy unaffected as shown in Block 371.

In Block 130, the system may communicate a response to the second family member to respond to the second family member communication from Block 110. Such response may include pre-filling available information into fields, such as driving record, a vehicle to which the second family member has been already designated as a principal driver, and other information. If appropriate, the system may quote a policy for such changes to the second family member. In Block 320, the system may determine whether the second family member accepts such change. If the answer is negative, the system may cancel or adjust the response in Block 370. If the second family member accepts such response, the system may determine whether a first family member needs to approve such change. If the answer is negative, the system may finalize the change in Block 330. Such finalization may include mailing instructions for payment, issuing a new policy, reducing the existing policy, or other changes, as may be appropriate. If the first family member does need to approve such change, then the system may communicate a response to the first family member in Block 327. The system may then determine if the first family member accepts the change in Block 329. If the family member accepts the change, then the system may finalize the change in Block 330. If the first family member does not accept the change, then the system may cancel or adjust the response in Block 370, as described above.

Figure 3:
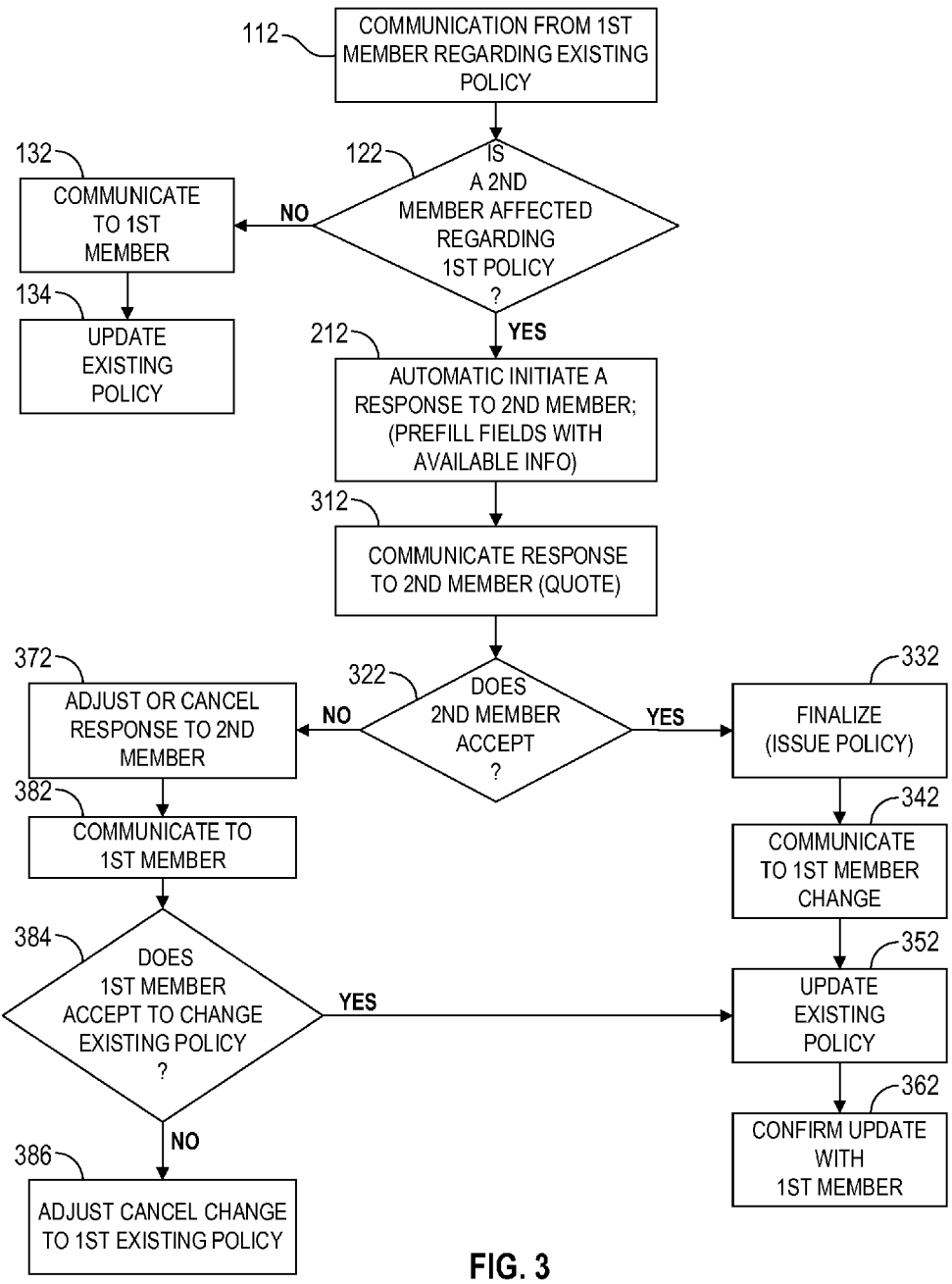
FIG. 3 is a schematic flowchart of another embodiment illustrating another automatic response to changes of circumstances.

FIG. 3 is a schematic flowchart of another embodiment illustrating another automatic response to changes of circumstances. FIG. 3 is similar to FIG. 2, but varies in that a first family member of the family may communicate with the insurance company regarding a change in circumstances and still be covered by the insurance policy, if the change in circumstances occurs, and the automatic communication is directed to a second family member of the family.

In Block 112, the insurance company may receive a communication from a first family member regarding a change in circumstances, affecting an existing insurance policy. In Block 122, the system determines if a second family member will be affected by the change in circumstances. For example, the second family member may be affected by the first family member informing the insurance company that the second family member is changing residences, has reached a certain age, is being listed as a primary driver on an alternative vehicle or a new vehicle, and other changes. Such examples are typical for automobile insurance policies, and corresponding examples could be given for medical, life, house, and other insurance policies, and are included herein. If the second family member is not affected by the change in insurance policy, then the system may communicate to the first family member in Block 132. The system may update the policy as necessary, and make other responses to the first family member in Block 134. Such responses may include updating the family's address, for example, if the family is moving to a new residence, or the family has purchased a new vehicle that may be driven as principal vehicle by the first family member, and the other changes that would not directly affect the second family member.

If the system determines that the second family member would be affected, then the system may automatically initiate a response to the second family member in Block 212. For example and without limitation, the response may be a quote for a new insurance policy, confirming a new address, changes in premiums, or other changes that may be particularly relevant to the second family member. The system may expedite the handling of the response by pre-filling data fields with available information, electronically known to the system. The system may automatically communicate the response to the second family member in Block 312. This automatic response may include, without limitation, emailing information to the second family member, if the second family member's email address is known, mailing via postal mail in response to the second family member, or sending an instruction to a family service representative to initiate telephone and/or other contact.

In Block 322, the system may determine whether the second family member accepts the response. If the second family member accepts the response, then the system may finalize the response, which may include issuing a second policy or other appropriate finalization, as shown in Block 332. In Block 342, the system may communicate the change to the first family member. In Block 352, the system may update the first policy, and confirm the update with the first family member in Block 362.

If the second family member does not accept the change in Block 322, then the system may adjust or cancel the response to the second family member in Block 372. In Block 382, the system may communicate the response to the first family member. In Block 384, the system may determine whether the first family member wishes to accept any associated change to the existing policy, in light of the adjustment or cancellation of the second family member, described above in Block 372. If the first family member accepts the change to the first policy, then the policy may be updated in Block 352 and confirmed with the first family member in Block 362.

Figure 4:
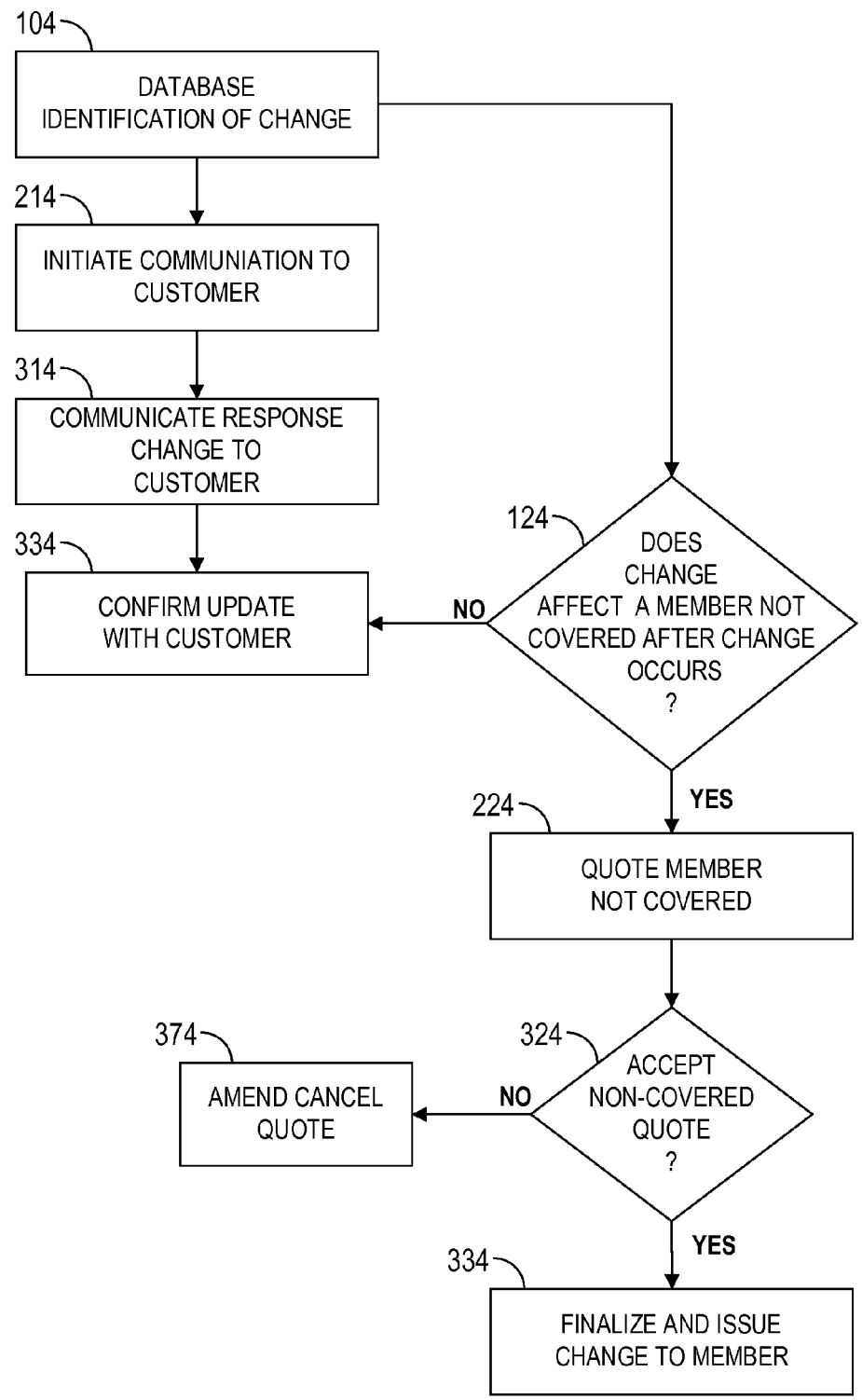
FIG. 4 is a schematic flowchart of another embodiment where changes of circumstances are not reported by any direct input of one or more dependents of the customer.

FIG. 4 is a schematic flowchart of another embodiment that illustrates changes of circumstances that are not reported by any direct input of one or more dependents of the family. A database typically stores records of relevant information for customers and their insurance policies. Records will generally include identifying information of one or more dependents of the family, such as age, location, where one or more dependents are attending college away from home, automobiles, health information, residence information, and other information, as may be appropriate for the particular type of insurance policy. A search through the database records may identify one or more dependents of one or more customers, subject to a change in circumstances. For example and without limitation, typically a family member may be covered through a parent's medical insurance policy up to age 18. Such coverage may be extended until age 25, if the family member is a fulltime student. A search of database records may identify the age of the family member. If the family member reaches age 18, the insurance company may automatically initiate a response and offer insurance coverage for the family member, as well as a change of insurance coverage for the parent(s) on the existing policy.

More particularly, in Block 104, the database may identify a change of circumstances. In Block 214, the system may initiate a communication to the family. The initiation of the communication may include assessing options for the family, depending on the particular change of circumstances. Such options may include initiating a quote or other response on an additional insurance policy, an adjustment to the existing insurance policy, or other changes as may be appropriate. In Block 314, the system may communicate the response to the family regarding the change of circumstances. In Block 334, the system may confirm the update with the family.

In some cases, a change of circumstances may affect a family member that will not be covered by the existing insurance policy, after the change occurs. For example, the family member may move away from the primary residence, reach an age in which the insurance coverage is no longer available, change marital status, and other such changes, as may affect the family member's insurance status. In Block 224, the system may automatically initiate a response, such as a quote, to the family member that is not covered after the change occurs. In Block 324, the system may determine whether the non-covered family member accepts the response. If the family member accepts the response, the system may finalize and issue the change to the family member in Block 334. If the non-covered family member does not accept the response, then the response may be amended or cancelled in Block 274.

Figure 5:
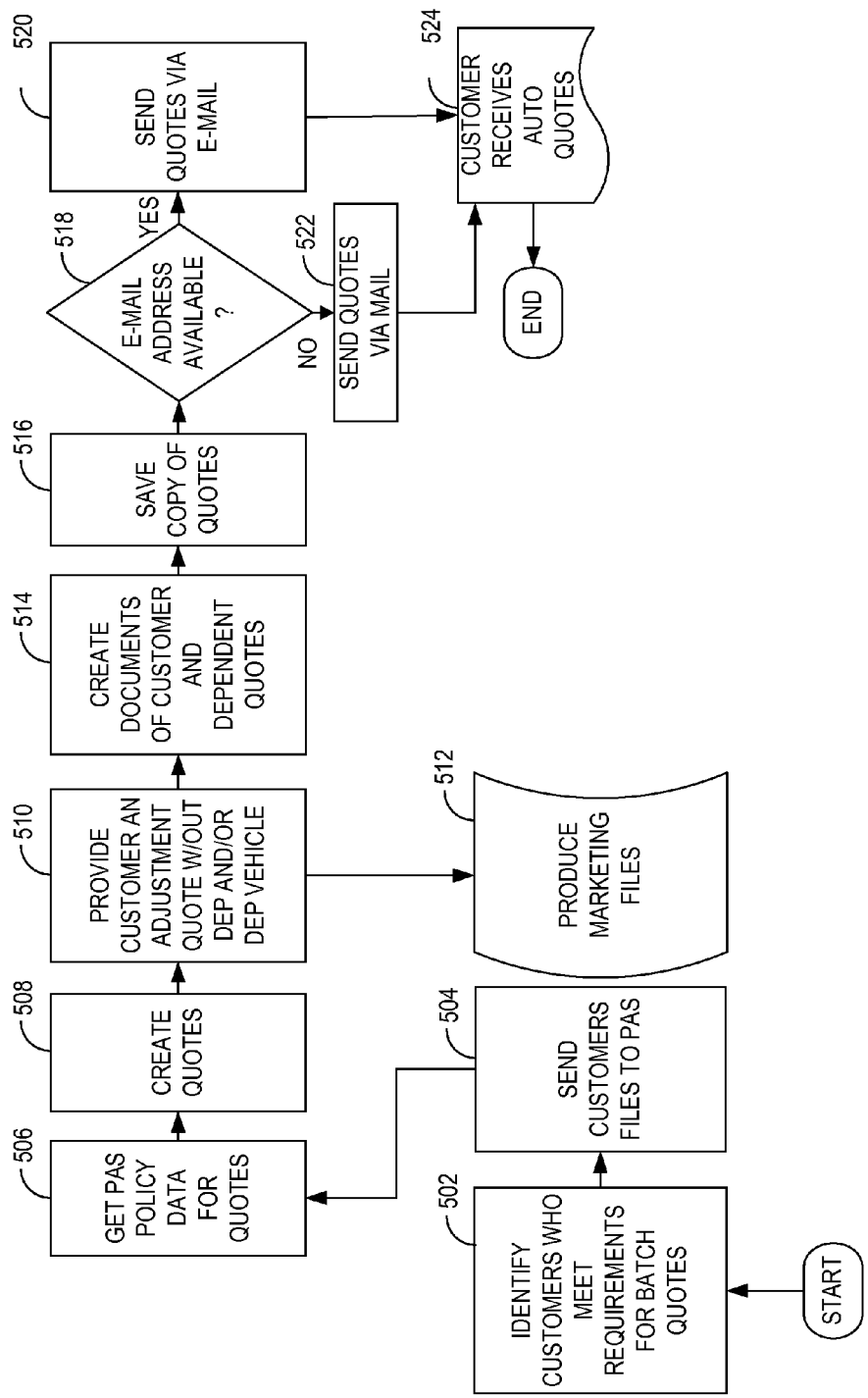
FIG. 5 is a schematic flowchart of another embodiment for batch processing of customers, having changes in circumstances.

FIG. 5 is a schematic flowchart of another embodiment for batch processing of customers, having changes in circumstances. In some cases, as described above according to FIG. 4, a database may be available that may search through various family records and identify customers having a change of circumstances. Depending on the number of customers and records, the database can identify customers having similar changes of circumstances. The system may batch process responses to such customers.

In Block 502, the system and method may identify customers and dependents thereof who meet certain requirements, suitable for a batch response. For example and without limitation, a series of dependents could reach a certain age and be amenable to quotes for separate insurance policies. In Block 504, the system and method may send information on the identified customers for further processing to a policy administration system and method (PAS). In Block 506, such processing may include processing family information stored the policy administration system and method sufficiently to initiate quotes. In Block 508, the system and method may create quotes and communicate the quotes to the customers in Block 510. The quotes may be offered in various alternatives to the customers. For example, the quotes may include adjustments without dependents who may have reached an age of majority. As an alternative, the quotes may be offered without the dependents and without the dependents' vehicles, which may have been listed as primary vehicles for the dependents on the existing insurance policies. In Block 514, the system and method may create documents to send to the customers based on a widely recognized format, such as Adobe PDF format documents. In Block 516, the documents may be saved in a queue to be sent to the various customers. In Block 518, the system and method may inquire whether an email address is available for each of the customers. For such available email addresses, the quotes may be sent via email in Block 520. For those customers not having available email addresses in the system and method, the quotes may be sent via mail, telephone, or other means of communication in Block 522. In Block 524, the customers may receive the automatically initiated quotes and make decisions based on such quotes.

Figure 6:
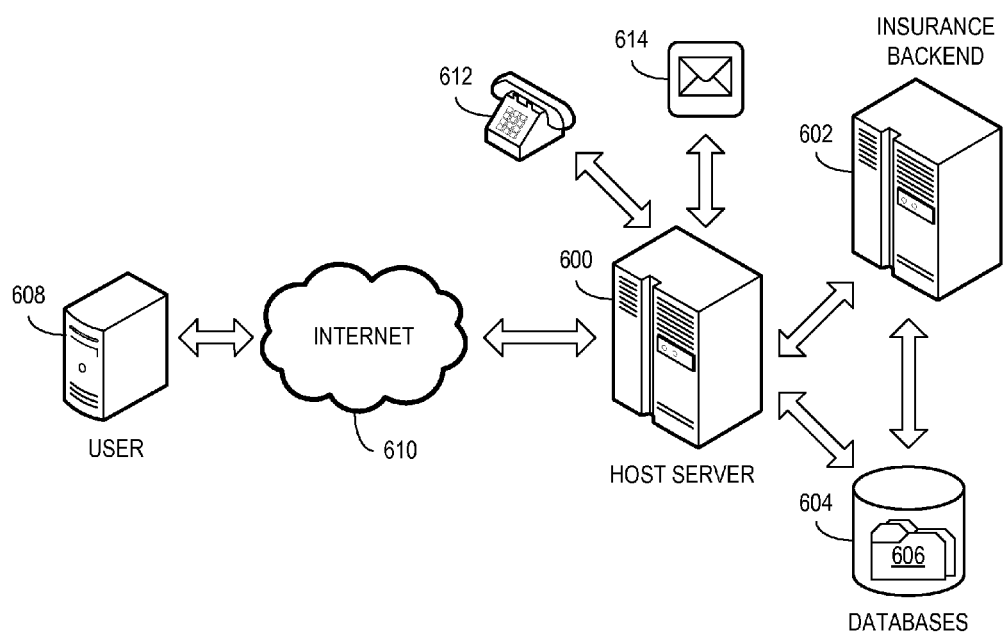
FIG. 6 is a schematic diagram of an exemplary infrastructure that may be used to implement the disclosed embodiments.

FIG. 6 is a schematic diagram of an exemplary infrastructure for determining a change in circumstances regarding an insurance policy, initiating a response, and communicating the response to a customer. The exemplary infrastructure includes at least one host server 600, an insurance backend 602, and one or more databases 604 having one or more records 606, all interconnected as shown. Such an infrastructure is generally well known to those having ordinary skill in the art and may be found at numerous companies. Such companies may include, for example, insurance companies, banks, credit card companies, mortgage companies, investment companies, and other financial institutions, government agencies, educational institutions, and so forth.

Briefly, the host server 600 may operate as a host for any Internet site, such as a Web site, for any company. A user 608 (e.g., customer, dependent, etc.) using a computer running an Internet browser, such as a Web browser, may then type in an appropriate URL (Uniform Resource Locator) for the Web site. The computer causes the URL to be resolved into an IP address that may be used to connect the computer to the host server 600 over the Internet 610. The user 608 may then conduct one or more transactions with the company via the host server 600. Such transactions may include, for example, changing to an insurance policy, and the like that may involve changes in circumstances regarding an insurance policy of the customer. These transactions and other requests received by the host server 600 are passed to the company's insurance backend 602, where they are processed by the company's business processes. The results of the backend processing are subsequently returned to the host server 600 for presentation to the user 608. Any data or information used by the insurance backend 602 or the host server 600 may be retrieved from and stored in the databases 604.

Figure 7:
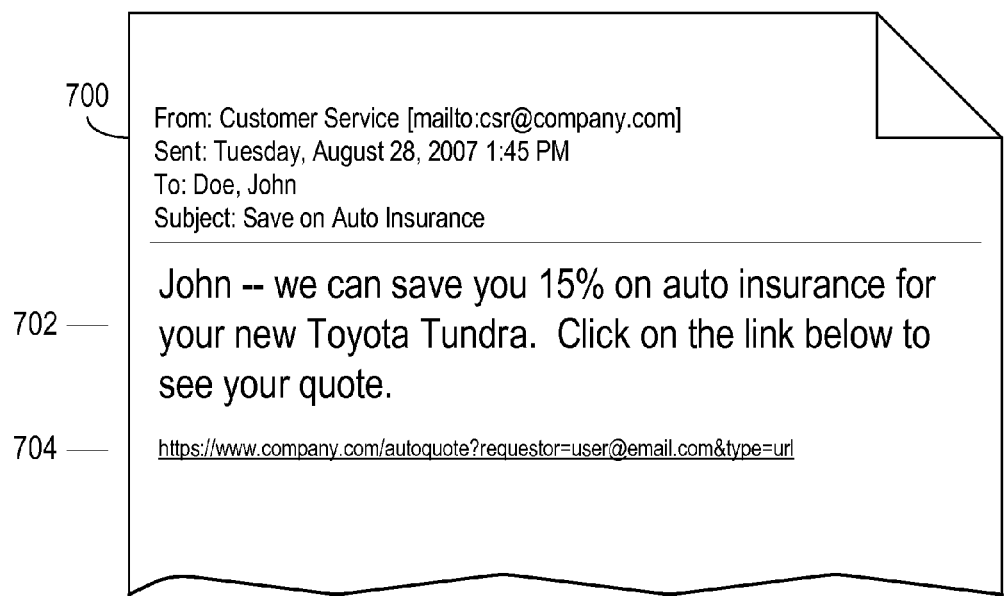
FIG. 7 is an exemplary e-mail message that may be used to communicate a response to a customer.

In accordance with the disclosed embodiments, the user 608 may access the Web site of the company to communicate changes in circumstances regarding the insurance policy. Alternatively, the user 608 may provide such information through a telephone 612 to an operator or service person at a call center, who then enters the change in circumstances into the server, or the service person may speak the change in circumstances into a voice system to input the changes. Still further, the user 608 may communicate via postal mail 614, or otherwise. Once the change in circumstances is entered, the effects of the change are subsequently processed to initiate a response. Depending on the embodiment and the particular change in circumstances, the response may be communicated to one or more users 608 who have not communicated the change to the insurance company. Such users 608 may receive the communication via the Internet 610 (i.e., e-mail, described below), telephonically through the telephone 612, through postal mail 614, or otherwise. In some embodiments, the insurance backend 602 may have sufficient information of the user 608 to initiate and communicate a change in circumstances to the user 608 without any communication of the change from the user 608. For example, the insurance backend 602 may have records of users' ages, driving history, primary driver designations, address, and other information. Such information may be retrieved and processed to determine if predefined criteria for a change in circumstances is met. For users 608 meeting such criteria, a response may be communicated to one or more users of the user 608 regarding the change in circumstances. The response to the one or more users may be offered and accepted by the one or more users. The system may update the insurance information and/or policy, and if appropriate issue a new policy to one or more users.

Where the communication to the user 608 is accomplished through the Internet 610, such communication may be in the form of an e-mail message. FIG. 7 illustrates an example of an e-mail message 700 that may be used to communicate a quote to the user 608. As can be seen, no particular format or design is required for the e-mail message 700, so long as the e-mail message 700 can convey to the user 608 that an auto insurance quote has been generated for him/her and that it would be beneficial for the user 608 to review the quote. A simple message, such as the one indicated at 702 may suffice. In addition, it would be convenient for the e-mail message 700 to provide a hyperlink 704 that can take the user 608 immediately to the quote. Such a hyperlink 700 for maybe a "hot link" or even a "deep dive link" in some cases.

As mentioned above, in addition to proactively generating a quote for the user 608, in some implementations, the user 608 may also request or initiate an auto insurance quote. FIG. 8 illustrates an exemplary quote request screen 800 that may be used by the user 608 to request or initiate an auto insurance quote. The user 608 requesting the quote may be a parent/spouse doing making the request on behalf of a his/her child/spouse, or the user 608 may be a dependent requesting a quote for himself/herself. The same or a similar quote request screen 800 may be used in all cases, or specialized quote request screens may be used for different cases. The same or a similar quote request screen 800 may also be used to allow the user 608 to edit a quote, either on his/her own behalf, or on the behalf of someone else.

As can be seen, in one implementation, the quote request screen 800 may include an effective date field 802, a for-whom field 804 for allowing the user to indicate for whom the quote is being requested. In some implementations, only options that are permitted by the company after verification by the insurance backend 602 (see FIG. 6) may be listed in the for-whom field 804. A name and address field 806 may be provided for the user to fill in the name and address of the person for whom a quote is being requested. This information may be pre-filled in the field 806 if it is available in the database 604. A plurality of question fields, indicated by way of example at 808-814, may be used to collect information from the user for purposes of generating a quote. The questions may include standard auto insurance questions, such as the type of vehicle being insured, the number of drivers for the vehicle, the amount of coverage desired, and the like. Some of these questions may be answered via a drop-down menu, radio buttons, or free-form text. A Cancel button 816 allows the user to cancel the request, a Get Quote button 818 allows the user to proceed with the request, a Send Quote button 820 allows the user to send the quote to the person for whom it is being requested, and the Apply button 822 allows the user to accept the quote.

Figure 9:
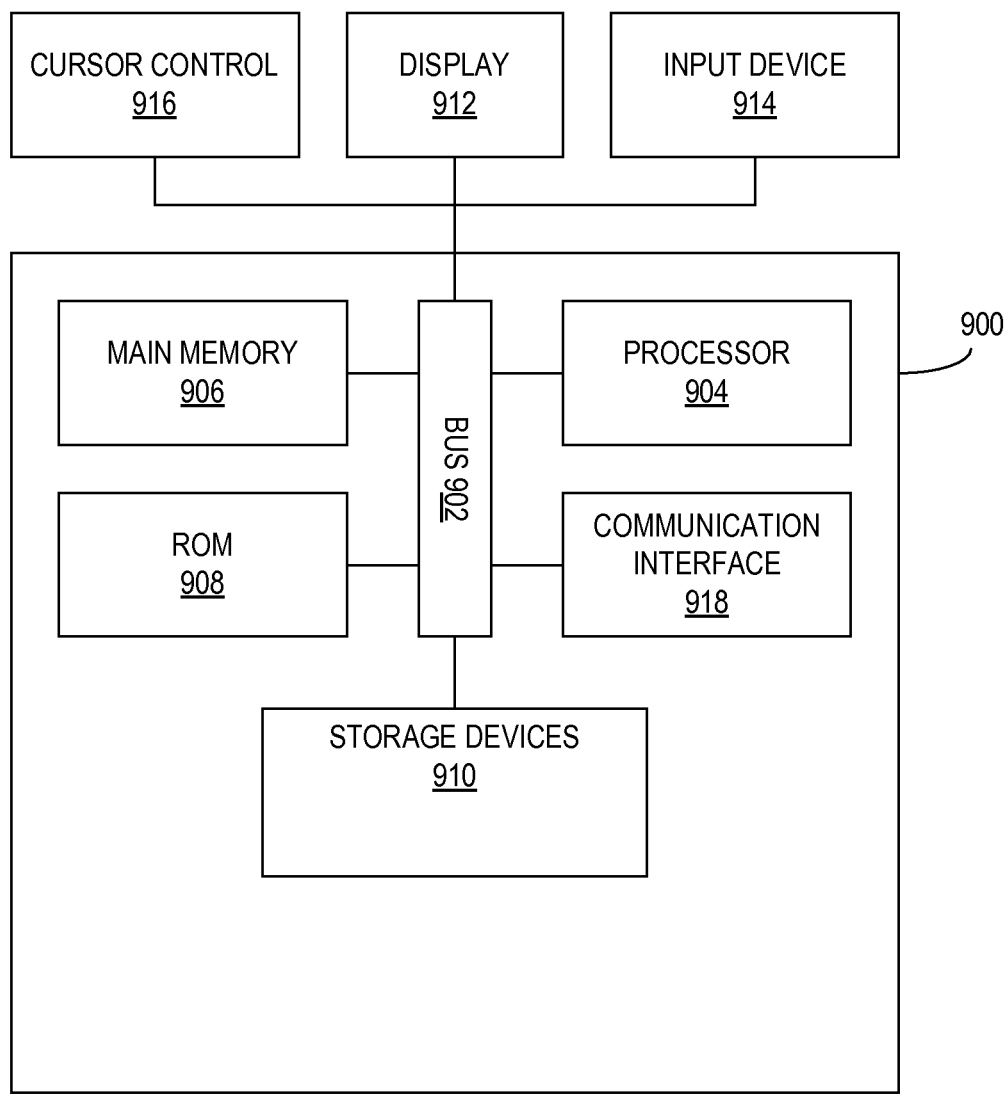
FIG. 9 is an exemplary Web page that may be used by a customer to request, send, and accept a response.

FIG. 9 illustrates the exemplary host server of FIG. 6 in more detail. Any suitable computer known to those having ordinary skill in the art may be used as the host server 600, including a personal computer, workstation, server, mainframe, and the like. Such a host server 600 typically includes a bus 902 or other communication mechanism for communicating information and a processor 904 coupled with the bus 902 for processing information. The host server 600 may also include a main memory 906, such as a random access memory (RAM) or other dynamic storage device, coupled to the bus 902 for storing computer readable instructions to be executed by the processor 904. The main memory 906 may also be used for storing temporary variables or other intermediate information during execution of the instructions to be executed by the processor 904. The host server 600 may further include a read-only memory (ROM) 908 or other static storage device coupled to the bus 902 for storing static information and instructions for the processor 904. A computer readable storage device 910, such as a magnetic, optical, or solid state device, may be coupled to the bus 902 for storing information and instructions for the processor 904.

The host server 600 may be coupled via the bus 902 to a display 912, such as a cathode ray tube (CRT) or liquid crystal display (LCD), for displaying information to a dependent. An input device 914, including, for example, alphanumeric and other keys, voice systems, screen touch systems, and other input systems may be coupled to the bus 902 for communicating information and command selections to the processor 904. Another type of dependent input device may be a cursor control 916, such as a mouse, a trackball, or cursor direction keys for communicating direction information and command selections to the processor 904, and for controlling cursor movement on the display 912. The cursor control 916 typically has two degrees of freedom in two axes, a first axis (e.g., X axis) and a second axis (e.g., Y axis), that allow the device to specify positions in a plane.

The term "computer readable instructions" as used above refers to any instructions that may be performed by the processor 904 and/or other components. The term "computer-readable medium" refers to any storage medium that may be used to store the computer-readable instructions. Such a medium may take many forms, including, but not limited to, non volatile media, volatile media, and transmission media. Non-volatile media may include, for example, optical or magnetic disks, such as the storage device 910. Volatile media may include dynamic memory, such as main memory 906. Transmission media may include coaxial cables, copper wire and fiber optics, including wires of the bus 902. Transmission media may also take the form of acoustic or light waves, such as those initiated during radio frequency (RF) and infrared (IR) data communications. Common forms of computer readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer may read.

Various forms of the computer readable media may be involved in carrying one or more sequences of one or more instructions to the processor 904 for execution. For example, the instructions may initially be borne on a magnetic disk of a remote computer. The remote computer may load the instructions into its dynamic memory and send the instructions over a telephone line using a modem. A modem local to the host server 600 may receive the data on the telephone line and use an infrared transmitter to convert the data to an infrared signal. An infrared detector coupled to the bus 902 may receive the data carried in the infrared signal and place the data on the bus 902. The bus 902 carries the data to the main memory 906, from which the processor 904 retrieves and executes the instructions. The instructions received by the main memory 906 may optionally be stored on the storage device 910 either before or after execution by the processor 904.

The host server 600 may also include a communication interface 918 coupled to the bus 902. The communication interface 918 typically provides a two way data communication coupling between the host server 600 and the Internet 610, other servers' storage media, and the like. For example, the communication interface 918 may be an integrated services digital network (ISDN) card or a modem used to provide a data communication connection to a corresponding type of telephone line. As another example, the communication interface 918 may be a local area network (LAN) card used to provide a data communication connection to a compatible LAN. Wireless links may also be implemented. Regardless of the specific implementation, the main function of the communication interface 918 is to send and receive electrical, electromagnetic, optical, or other signals that carry digital data streams representing various types of information.

The systems and methods herein have been described in the context of various embodiments and not every embodiment has been described. Apparent modifications and alterations to the described embodiments are available to those of ordinary skill in the art. The disclosed and undisclosed embodiments are not intended to limit or restrict the scope or applicability of the concepts of the Applicants, but rather, in conformity with the patent laws, Applicants intend to protect all such modifications and improvements to the full extent that such falls within the scope or range of equivalent of the following claims.

The various methods and embodiments of the disclosure may be included in combination with each other to produce variations of the disclosed methods and embodiments, as would be understood by those with ordinary skill in the art, given the understanding provided herein. Also, various aspects of the embodiments may be used in conjunction with each other to accomplish the understood goals of the disclosure. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. Discussion of singular elements may include plural elements and vice-versa. References to at least one item followed by a reference to the item may include one or more items. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of dependents together and may further include, without limitation, integrally forming one functional dependent with another in a unity fashion. The coupling may occur in any direction, including rotationally.

The order of steps may occur in a variety of sequences unless otherwise specifically limited. The various steps described herein may be combined with other steps, interlineated with the stated steps, and/or split into multiple steps. Additionally, the headings herein are for the convenience of the reader and are not intended to limit the scope of the disclosure. Other and further embodiments utilizing one or more aspects of the concepts described above may be devised without departing from the spirit of Applicants' disclosure. For example, other means of using phonetics to convert the free text expressions may be used. Other variations are contemplated given the teachings of the disclosure herein.

Further, any references mentioned in the application for this patent, as well as all references listed in the information disclosure originally filed with the application, are hereby incorporated by reference in their entirety to the extent such may be deemed essential to support the enabling of the disclosure. However, to the extent statements might be considered inconsistent with the patenting of the concepts, such statements are expressly not meant to be considered as made by the Applicant(s).

What is claimed is:

1. A system for automatically providing insurance policy changes for a customer, comprising:
   at least one subsystem including a processor and memory coupled to the processor and configured to electronically determine a change in circumstances of an existing customer relative to a first insurance policy;
   at least one subsystem including a processor and memory coupled to the processor and configured to receive a communication from a first family memory relating to the change in circumstances, wherein the communication is provided without solicitation from an insurance company and the change in circumstances is associated with the first family member;
   at least one subsystem including a processor and memory coupled to the processor and configured to initialize an automatic response relating to the change in circumstance; and
   at least one subsystem including a processor and memory coupled to the processor and configured to automatically communicate the response to at least one family member of the customer, wherein the response is communicated to a second family member of the customer covered by the first insurance policy regarding the change in circumstances after the change in circumstances occurs, the response being communicated as a result of the communication from the first family member affecting the first insurance policy, and the response includes information regarding available changes to the first insurance policy due the change in circumstances.

2. The system of claim 1, wherein the at least one subsystem configured to electronically determine the change is configured to determine the change from database information of an insurance company independent of a communication from the customer directed to the insurance policy.

3. The system of claim 1, wherein the at least one subsystem configured to automatically communicate is further configured to communicate a response to the first family member of the customer not covered by the first insurance policy regarding the change in circumstances after the change in circumstances occurs, the response being communicated as a result of input from the first family member of the customer regarding the change in circumstances after the change in circumstances occurs.

4. The system of claim 1 wherein the at least one subsystem configured to automatically communicate comprises:
at least one subsystem configured to quote to the second family member of the customer a change in the first insurance policy based on the change in circumstances; and
at least one subsystem configured to quote to the first family member of the customer a second insurance policy based on the change in circumstances.

5. The system of claim 1, wherein the at least one subsystem configured to electronically determine is configured to determine that a family member of the customer is at least becoming an age affecting the insurance policy, the family member is at least moving to a new address separate from a known address of the customer, the family member is at least acquiring another vehicle, or a combination thereof.

6. The system of claim 1, further comprising at least one subsystem configured to automatically provide policy changes to a batch of customers based on a common change in circumstances.

7. A computer-implemented method of automatically providing insurance policy changes for a customer, comprising:
using a processor in a system including a processor and a memory for storing executable instructions that are executable by the processor to perform:
electronically determining a change in circumstances of an existing customer relative to a first insurance policy in a computer;
receiving a communication from a first family memory relating to the change in circumstances, wherein the communication is provided without solicitation from an insurance company and the change in circumstances is associated with the first family member
initializing an automatic response relating to the change in circumstances in the computer; and
automatically electronically communicating the response to at least one family member of the customer over an electronic communication device, wherein the response is communicated to a second family member of the customer covered by the first insurance policy regarding the change in circumstances after the change in circumstances occurs, the response being communicated as a result of the communication from the first family member affecting the first insurance policy, and the response includes information regarding available changes to the first insurance policy due the change in circumstances.

8. The method of claim 7, wherein electronically determining the change in circumstances of the existing customer relative to the first insurance policy comprises electronically determining the change from database information of an insurance company independent of a communication from the customer directed to the insurance policy.

9. The method of claim 7, wherein automatically communicating the response to the family member of the customer further comprises communicating a response to the first family member of the customer not covered by the first insurance policy regarding the change in circumstances after the change in circumstances occurs, the response being communicated as a result of input from the first family member of the customer regarding the change in circumstances after the change in circumstances occurs.

10. The method of claim 7, wherein automatically communicating the response to the family member of the customer comprises:
quoting to the second family member of the customer a change in the first insurance policy based on the change in circumstances; and
quoting to the first family member of the customer a second insurance policy based on the change in circumstances.

11. The method of claim 7, wherein electronically determining the change in circumstances comprises electronically determining that a family member of the customer is at least becoming an age affecting the insurance policy, the family member is at least moving to a new address separate from a known address of the customer, the family member is at least acquiring another vehicle, or a combination thereof.

12. The method of claim 7, further comprising automatically providing policy changes to a batch of customers based on a common change in circumstances.

13. A non-transitory computer-readable medium encoded with computer-readable instructions for automatically providing insurance policy changes for a customer, the computer-readable instructions comprising instructions for causing a computer to:
electronically determine a change in circumstances of an existing customer relative to a first insurance policy;
receiving a communication from a first family memory relating to the change in circumstances, wherein the communication is provided without solicitation from an insurance company and the change in circumstances is associated with the first family member;
initialize an automatic response relating to the change in circumstance; and
automatically communicate the response to at least one family member of the customer, wherein the response is communicated to a second family member of the customer covered by the first insurance policy regarding the change in circumstances after the change in circumstances occurs, the response being communicated as a result of the communication from the first family member affecting the first insurance policy, and the response includes information regarding available changes to the first insurance policy due the change in circumstances.

14. The non-transitory computer-readable medium of claim 13, wherein the computer-readable instructions for causing a computer to electronically determine the change causes the computer to determine the change from database information of an insurance company independent of a communication from the customer directed to the insurance policy.

15. The non-transitory computer-readable medium of claim 13, wherein the computer-readable instructions for causing a computer to automatically communicate causes the computer to communicate a response to the first family member of the customer not covered by the first insurance policy regarding the change in circumstances after the change in circumstances occurs, the response being communicated as a result of input from the first family member of the customer regarding the change in circumstances after the change in circumstances occurs.

16. The non-transitory computer-readable medium of claim 13 wherein the computer-readable instructions for causing a computer to automatically communicate comprises instructions for causing the computer to:

quote to the second family member of the customer a change in the first insurance policy based on the change in circumstances; and quote to the first family member of the customer a second insurance policy based on the change in circumstances.

17. The non-transitory computer-readable medium of claim 13, wherein the computer-readable instructions for causing a computer causes the computer to determine that a family member of the customer is at least becoming an age affecting the insurance policy, the family member is at least moving to a new address separate from a known address of the customer, the family member is at least acquiring another vehicle, or a combination thereof.

18. The non-transitory computer-readable medium of claim 13, further comprising computer-readable instructions for causing a computer to automatically provide policy changes to a batch of customers based on a common change in circumstances.

* * * * *